United States Patent Office 3,814,748
Patented June 4, 1974

3,814,748
PROCESS FOR PRODUCING COTTONSEED PROTEIN ISOLATES
Robert L. Olson and Dean R. Frazeur, Muscatine, Iowa, assignors to Grain Processing Corporation, Muscatine, Iowa
No Drawing. Filed Feb. 25, 1972, Ser. No. 229,582
Int. Cl. A23j 1/14
U.S. Cl. 260—123.5         3 Claims

ABSTRACT OF THE DISCLOSURE

Cottonseed flour or flakes are extracted for a short time with alkali and the extract is acidified to a pH in the range of 7.0 to 8.0 to produce a major protein isolate substantially devoid of objectionable color.

This invention relates to the preparation of protein isolates from cottonseed.

It is well known that cottonseed is an available source of edible protein suitable for use in a variety of food products. After dehulling, defatting and grinding or flaking, and removal of glands in glanded seed, it is possible to extract protein from the resulting cottonseed flour or flakes to provide valuable cottonseed protein isolates.

Several methods have been devised for accomplishing this. The classical procedure for the preparation of cottonseed isolates is similar to the procedure employed for producing soybean protein isolates. Thus, the maximum amount of protein is extracted with dilute alkali and separated by centrifugation from the spent residue. The liquid extract is then acidified to the point of minimum solubility, generally about pH 5. The curd which then precipitates is concentrated by centrifugation, washed and dried to yield a single isolate containing both water-soluble and water-insoluble proteins.

Another method for producing cottonseed protein isolates will be referred to herein as "prior art selective extraction procedure." According to this procedure, cottonseed flakes or flours are first extracted for a period of about thirty minutes or more with water. The aqueous extract is then adjusted to about pH 4 so as to precipitate low molecular weight water-soluble proteins. The residue from the first extraction is then again extracted for a period of about thirty minutes or more with dilute alkali with the alkaline extract then being acidified to a pH of about 7 so as to precipitate high molecular weight water-insoluble proteins. This selective extraction procedure is described in an article by L. C. Berardi, W. H. Martinez and C. J. Fernandez, "Cottonseed Protein Isolates: Two Step Extraction Procedure," Food Technology, vol. 23, No. 10, pp. 75–82.

These authors report that the water soluble proteins precipitable at pH 4 (minor isolate) constitute about 16% of the total nitrogen content of flour and the high molecular weight alkali soluble (water insoluble) proteins precipitable at pH 7 (major isolate) constitute about 52% of the total nitrogen content.

Another recent method of producing protein isolates from cottonseed will be referred to herein as "prior art selective precipitation procedure" and involves extracting cottonseed flour or flakes with a dilute alkali solution at a pH of about 10.5 for a period of thirty minutes or more. The extract is then acidified to a pH of 7 with precipitation of high molecular weight alkali-soluble proteins (major isolate). A second precipitate or isolate (minor isolate) of low molecular weight water-soluble proteins is obtained by subsequently adjusting the pH to 4.

The isolates obtained by the "prior art selective precipitation procedure" are generally similar in major respects, including yields, to the protein isolates obtained by the above-described "prior art selective extraction procedure." In both cases the major isolates generally possess considerable color which renders them objectionable or unsuitable for many applications. Thus, these major isolates generally are accorded color numbers 90 or 93 using the color classification of the Inter-Society Color Council-National Bureau of Standards (ISCC-NBS). By this method of designating colors each specific color has been assigned a number. The number 90 indicates a gray-yellow color, a number 92 a yellow-white, and a number 93 a yellow-gray.

The present invention represents a significant improvement in the "prior art selective precipitation procedure" and provides an improved method whereby a major cottonseed protein isolate is obtained in good yield, which isolate has significantly improved color, that is, the isolate obtained is practically white or substantially devoid of color as compared with the prior art major isolates. Moreover, by the improved process of this invention the processing time is significantly reduced.

In accordance with the present invention, cottonseed flour (including flakes) is subjected to extraction at a pH of approximately 10 to 11.5, preferably 10.5, with dilute aqueous alkali. Aqueous alkali solutions of sodium hydroxide or potassium hydroxide and the like can be employed as is known. The ratio of the extractant solution to the flour can vary widely, such as about 10:1 to 30:1, preferably 20:1 (volume of aqueous alkali solution in milliliters:weight of flour in grams). The alkali solution may be divided into several portions to accomplish several extractions to thereby increase the efficiency of protein extraction. The extraction is carried our in any convenient manner. Thus, for example, the cottonseed flour (or flakes) can be added directly to the extractant alkali solution with agitation or the flour can be added to water and then a concentrated alkali solution added thereto to achieve the desired pH. In any event, the flour and alkali solution are thoroughly mixed and the mixture is, without undue delay, subjected to centrifugation. To avoid the development of objectionable color, it is important that the extraction time be relatively short and it is thus preferred that the operations of alkali extraction, separation of the extract, and lowering of the pH of the resulting extract be completed in less than about thirty minutes. In the prior art extraction procedures extracting times of thirty minutes or more, excluding the time required for separation of the extract and lowering the pH of the resulting extract, are employed. After separation of the liquid protein extract the pH thereof is then carefully adjusted, preferably to a pH of about 7.3 to 7.5, by the addition of a suitable acid, such as, for example, hydrochloric, phosphoric or citric acid and the like. The acid is added to the liquid extract with adequate mixing to prevent any localized high acid concentration. The addition of an acid to provide a preferred pH of from 7.3 to 7.5 results in the precipitation of a water-insoluble, acid-soluble major isolate which is then separated by centrifugation. The precipitate or isolate can then be dried in the isoelectric form by conventional procedures or it can be dried in the soluble form by first adjusting the pH thereof to about 3.5. A second protein isolate, the minor isolate, is then precipitated by adjusting the pH of the liquid extract to about 4.6. This minor isolate can be collected by centrifugation and dried.

The cottonseed material which is subjected to extraction with the dilute alkali can be glandless cottonseed flour (or flakes), deglanded cottonseed flour (or flakes) produced by the Liquid Cyclone Process or air classified cottonseed concentrate. The production of such cottonseed flours is relatively new. Glandless flours are produced by the dehulling, defatting and grinding of glandless cottonseeds. In the Liquid Cyclone Process for production of cottonseed flours, dehulled whole and cracked meats obtained from glanded cottonseeds are dried to a moisture content of about 3% and flaked. The flakes are fluidized with hexane, comminuted in a stone mill to separate cellular tissue from the pigment glands, diluted with additional hexane and passed through a liquid cyclone where separation based on size, shape and density of the particles is achieved. The underflow product is rich in pigment glands and cell wall fragments. The flour particles in the overflow are concentrated on a vacuum filter, washed with solvent to remove residual oil and desolventized. It is known also that protein concentrates can be obtained from defatted glandless cottonseed flour by air classification. In this process of centrifugation in air the intact protein bodies are separated from clusters of cells and cell wall fragments with adhering residual cytoplasm. The flour particles entering the air classifier are either accepted or rejected on the basis of size, shape and density. The coarse, low-protein fraction is usually discharged by the classifier while the fine protein concentrate containing predominantly intact protein bodies of 5 to 15 microns in diameter is collected in the cyclone and the very finest fraction can be recovered in the dust collector. Cottonseed protein flours obtained by any known procedure can be utilized in accordance with this invention.

The following examples further illustrate the improved process of the present invention.

EXAMPLE I

A 30 gram sample of Liquid Cyclone Process cottonseed flour was extracted first with 400 milliliters of 0.030 normal sodium hydroxide and then with 200 milliliters of 0.005 normal sodium hydroxide. The extracts were combined and the major protein isolate precipitated by pH adjustment to 7.4. The isolate was collected by centrifugation, slurried with water, adjusted to pH 3.5, and freeze dried. The minor protein isolate was then precipitated from the extract by pH adjustment to 4.6. The minor isolate was collected by centrifugation, slurried with water, adjusted to pH 7.0 with 1.0 normal sodium hydroxide and freeze dried.

The major isolate was 95.5% protein and it contained 60.9% of the starting flour protein. The major isolate had a white color (ISCC-NBS No. 263). The minor isolate was 80.5% protein and it contained 22.8% of the starting flour protein. The minor isolate had a gray-yellow color (ISCC-NBS No. 90).

EXAMPLE II

The procedure of Example I was repeated with a 30 gram sample of glandless cottonseed flour.

The major isolate was 94.9% protein and had a white color (ISCC-NBS No. 263). The minor isolate was 87.9% protein and had a gray-yellow color (ISCC-NBS No. 90).

A comparison of the results obtained by the present process and those obtained by the "prior art selective precipitation procedure" are shown in the table below. Also included in the table are reported results obtainable by the "prior art selective extraction procedure."

|  | Process of present invention [1] | Color (ISCC-NBS) | Prior art [2] | Color (ISCC-NBS) | Prior art selective extraction procedure percent nitrogen recovered |
|---|---|---|---|---|---|
| Major isolate | 60.9 | 263 | 68.0 | 93 | 53 approximately. |
| Minor isolate | 22.8 | 90 | 12.9 | 90 | 16 approximately. |
| Total recovery | 83.7 |  | 80.9 |  | 69 approximately. |

[1] Percent of nitrogen in flour.
[2] Selective precipitation procedure percent of nitrogen in flour.

As will be noted, the major protein isolate produced by the process of the present invention has a desirable white color. The protein isolate may therefore be used for protein fortification or as a protein ingredient in products such as fruit juices, fruit drinks, carbonated and non-carbonated soft drinks, spun or textured protein foods and extruded snack foods. The minor protein isolate of the present process is soluble in water at neutral pH and is useful as a functional and nutritional improvement in products as a protein ingredient for similar foods, spun or textured foods and extruded snack foods.

Those modifications and equivalents which fall within the spirit of the invention and the scope of the appended claims are to be considered a part thereof.

What is claimed is:

1. A process of obtaining protein from cottonseed which comprises:
 (a) subjecting defatted, deglanded or glandless cottonseeds to extraction with a dilute aqueous alkali at a pH in the range from 10 to 11.5,
 (b) separating the dilute aqueous alkali extract from the extracted cottonseeds,
 (c) then adjusting the pH of the aqueous alkali extract to a value within the range of 7.0 to 8.0 to precipitate protein, and
 (d) separating the so-precipitated protein
all of the said steps (a), (b) and (c) being completed in a period of not more than about thirty minutes.

2. The process of claim 1 wherein step (c) is accomplished by adjusting the pH of the aqueous alkali extract to a value of 7.3 to 7.5.

3. A process of obtaining protein from cottonseed which comprises:
 (a) subjecting defatted, deglanded or glandless cottonseeds to extraction with a dilute aqueous alkali at a pH in the range from 10 to 11.5,
 (b) separating the dilute aqueous alkali extract from the extracted cottonseeds,
 (c) then adjusting the pH of the aqueous alkali extract to a value within the range of 7.0 to 8.0 to precipitate protein,
 (d) separating the so-precipitated protein,
 (e) then adjusting the pH of the aqueous alkali extract to a pH of about 4.6 to precipitate additional protein, and (f) separating the last-mentioned precipitated protein, all of the said steps (a), (b) a)nd (c) being completed in a period of not more than about thirty minutes.

References Cited

UNITED STATES PATENTS

| | | | |
|---|---|---|---|
| 2,194,867 | 3/1940 | Olcott | 260—123.5 |
| 2,549,526 | 4/1951 | Rowe | 260—123.5 |
| 2,589,867 | 3/1952 | Rowe | 260—123.5 |
| 3,490,914 | 1/1970 | Okumura et al. | 260—123.5 |
| 3,579,496 | 5/1971 | Martinez et al. | 260—123.5 |

OTHER REFERENCES

Industrial and Engineering Chemistry, vol. 37, No. 12, 1945, Fontaine et al., pp. 1232–1236.

Food Technology, October 1969, pp. 75–82, Berardi et al.

SOS/70 Proceedings, Third International Congress, Food Sceince and Technology, Washington, D.C., August 1970, Martinez et al., pp. 248–259.

Papers 82, 83, 84 of ACS Meeting of September 1967, Berardi et al.

HOWARD E. SCHAIN, Primary Examiner